UNITED STATES PATENT OFFICE.

EUGENE A. SAVARY, OF NEW YORK, N. Y.

PROCESS OF MAKING CRYSTALLINE GLASS.

SPECIFICATION forming part of Letters Patent No. 332,441, dated December 15, 1885.

Application filed July 23, 1885. Serial No. 172,452. (No specimens.)

*To all whom it may concern:*

Be it known that I, EUGENE A. SAVARY, a citizen of the United States, residing at New York, in the county and State of New York, have invented new and useful Improvements in Process of Making Crystalline Glass, of which the following is a specification.

My invention relates to improvements in processes for producing crystalline glass; and it consists in first coating the glass with a solution of Epsom salts, allowing the same to dry on the glass and then treating the coated glass with hydrofluoric acid; and the process also consists in first coating the glass with a solution of Epsom salts in beer, allowing the same to dry on the glass and then treating the latter with hydrofluoric acid.

In carrying out my new process I first form a solution of Epsom salts ($MgSO_4 7H_2O$) in beer, sufficient Epsom salts being added to the liquid to carry the solution to the point of saturation. This solution is then distributed upon one side of the glass, either with a brush, or, when suitable tanks are employed to contain the solution, the glass may be dipped into the same. The glass thus coated is then exposed to sunlight, or placed in a drying-room, to facilitate the evaporation of the liquid part of the solution, and after a sufficient period of time has elapsed to effect this purpose crystals of the salts will have been deposited upon the surface of the glass, while the body or solid particles of the beer forms a glutinous coating, which fixes the crystals in position upon the glass. The coated side of the glass is now treated with a solution of hydrofluoric acid in the ordinary manner, by forming a "trough" with wax or the like, and then pouring the acid over the surface of the glass. The portions of the glass protected by the crystals of the Epsom salts are not attacked by the acid, while the parts between the crystals which are not so protected are eaten away, leaving the protected parts standing out prominently.

Instead of using beer as a solvent of the Epsom salts, water or other suitable agent may be employed; but on account of the glutinous residue formed by the evaporation of this solvent, which holds the crystals in place, as before mentioned, I prefer to use beer.

The advantage of my process over others appertaining to the same art is that the contour or edges of the embossed or etched surface can be smoothly and exactly fixed—that is to say, the said edges are not left irregular or rough, as is the case in processes heretofore in use, the roughness of the edges being due to the "working" of the protecting ground or covering used in the said processes, while by the use of Epsom salts as a covering or ground I have found that this disadvantage is entirely obviated.

What I claim as new, and desire to secure by Letters Patent, is—

1. The herein-described process of producing crystalline glass, consisting in first coating the glass with a solution of Epsom salts, allowing the same to dry on the glass and then treating the coated surface with hydrofluoric acid.

2. The herein-described process of producing crystalline glass, consisting in first coating the glass with a solution of Epsom salts in beer, allowing the same to dry on the glass and then treating the coated surface with hydrofluoric acid.

In testimony whereof I have hereunto set my hand and seal in the presence of two subscribing witnesses.

EUGENE A. SAVARY. [L. S.]

Witnesses:
E. F. KASTENHUBER,
A. FABER DU FAUR, Jr.